UNITED STATES PATENT OFFICE.

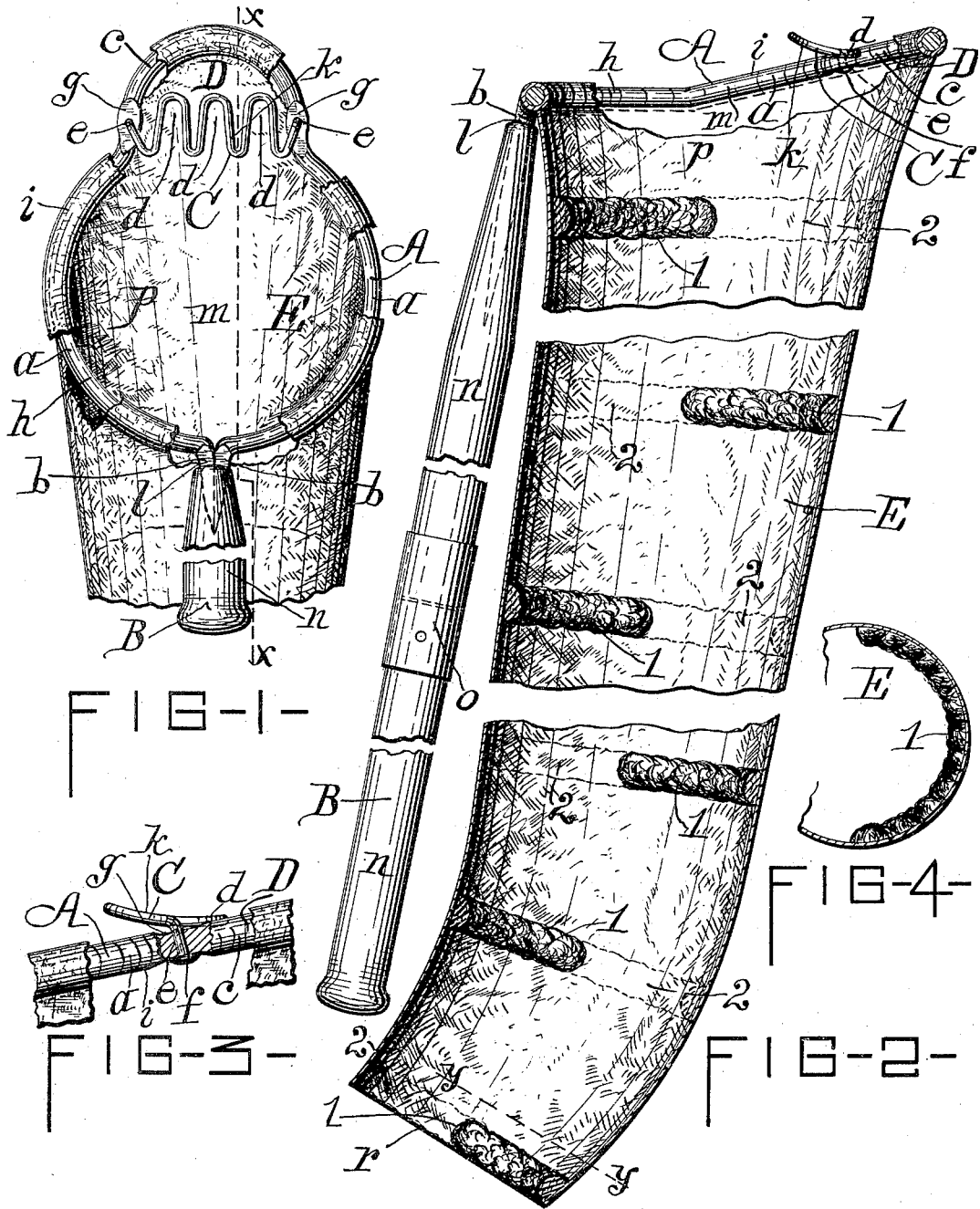

HORATIO E. CADY, OF SYRACUSE, NEW YORK.

FRUIT-PICKER.

SPECIFICATION forming part of Letters Patent No. 600,256, dated March 8, 1898.

Application filed July 20, 1897. Serial No. 645,284. (No model.)

*To all whom it may concern:*

Be it known that I, HORATIO E. CADY, of Syracuse, in the county of Onondaga and State of New York, have invented new and useful Improvements in Fruit-Pickers, of which the following, taken in connection with the accompanying drawings, is a full, clear, and exact description, reference being had to the said drawings, and to the letters and figures of reference marked thereon, which form a part of this specification.

My invention relates to fruit-pickers, gatherers, and analogous devices designed for the picking or gathering of fruit from trees.

The object of my invention is the production of a device of the character stated wherein invariably all knives or cutting edges are dispensed with, the fruit being pulled off in a natural manner, as by hand; wherein in the rear of the loops or fingers of the picker a satisfactory space is provided sufficient to insure a direct pull on the fruit, in which a wire formation of simplicity and requisite strength and rigidity is attained in the holder portion; wherein the incline or pitch of the portions embodying the holder and the picking loops or fingers are so diversified as to insure a double purchase or draft on the fruit in the separation of the stems from the limb; a picker in which no bag or analogous receptacle is employed, but, contrariwise, an elongated conductor of suitable textile material adapted to reach from its holder to the ground and discharging the fruit as picked directly to the ground; the providing of a suitably-padded conductor to insure the retarding of the velocity of the plucked fruit in its passage and the exit thereof through the discharge end not sudden, but easy; a picking device in which the supporting-pole thereof is readily adapted to be extended or lessened in length, and, finally, in the utilization of certain details of construction imparting increased efficiency and value in a comparatively inexpensive manner to a device of this species.

My invention consists of the novel features of construction and arrangement and combination of parts and operation and adaptation hereinafter more fully described, specifically enumerated in the annexed clauses of claim, and clearly shown in the drawings, in which—

Figure 1 is a top plan of my improved fruit-picker; Fig. 2, a longitudinal section taken along dotted line $x\,x$, Fig. 1; Fig. 3, an enlarged detail illustrating the manner of attachment of the member having the loops or fingers for picking with the holder portion; and Fig. 4 is a transverse section taken at dotted line $y\,y$, Fig. 2, and illustrating one of the cushions or retarding mediums wherewith the interior of the textile conductor is preferably provided.

Throughout the several views like letters and ordinals indicate corresponding parts.

The frame or holder A is of stiff and requisitely heavy wire and is so formed or bent as to comprise in one integral length two arcs of a circle $a\,a$, meeting at the central forward portion and thereat respectively bending at a right angle, continuing forwardly in abuttal through proper welding together, as at $b\,b$, forming a pointed shank that penetrates and is rigidly secured in the upper end of an elongated handle B, while rearwardly the arcs $a\,a$ are connected by a backward-extended segment of a circle or smaller arc $c$, so located with reference to the aforesaid arcs as to form reverse curves at or contiguous the points $g\,g$, marking the rearward terminations of the large arcs $a\,a$ and conjointly creating the holder or hoop for the attachment of parts now to be described.

C denotes a separate length of wire of smaller diameter so bent or convoluted as to form loops or fingers $d\,d\,d$ of rounded wire, as illustrated, and in the present exemplification insuring three loops capable of rupturing the stems of fruit, one or more coming into service concurrently, according to the conditions existing, said loops all being so relatively arranged that the stems of the fruit penetrate the loops from the front. The extremities of the wire forming the loops are so bent as to respectively enter and pass through orifices $e\,e$ in the frame or holder A at those points where the arcs $a\,a$ intersect the smaller segment or rear-curving arc $c$, the said penetrating ends being upset, (see $f\,f$,) insuring ready and rigid attachment of the convoluted member to the heavier wire forming the holder, and preferably said holder is slightly flattened when the aforementioned connections are made to render easier the punching of the orifices. (See *g g*.)

The disposal of the stem-rupturing member C transversely across the holder or hoop at the location shown insures the attainment of such a satisfactory space D back of such looped member and interposingly same and the segment portion *c* of the holder as to allow for a direct central draft on the fruit to be plucked incidental to the manipulating of my device.

By my utilization of the small segment or arc *c* in conjunction with the arcs *a a* a substantial decrease in the width of the holder is attained at and contiguous whereto the convoluted member C, furnished with the fingers *d*, extends across from the points *g g*, thereby insuring, as is evident, increased stiffness and immovability of said pulling-fingers, while concurrently securing the space so essential in the rear of such fingers.

While the forward portion—that facing the operator—of the curvilinear holder or frame A lies on a practically horizontal plane, as at *h*, the rearward and major portion incliningly rises therefrom, as at *i*, while the looped or convoluted member C reversely inclines upward forwardly antagonistically to the incline of the rear portion of the holder A, as indicated at K, the aforesaid disposal insuring, as is evident, not only a more satisfactory but in reality a double purchase in the separation of the fruit and its stem from the limb of a tree, and is of importance, as the better the purchase the more satisfactory is the operation of picking the fruit.

The wire terminations *b b*, creating the shank fitting into the handle B, are bent at quite an acute angle and downwardly from the plane occupied by the horizontal portion *h* of the holder or frame A, whereby the proper operative position of the holder and looped or fingered member C is far more readily attained by the handle extending downward at a substantial angle to the holder and loops than is possible with a handle which extends downward on a practically similar plane thereto, the aforementioned differential projection of the shank portion being indicated by the letter *l*. Obviously a large and practically circular opening (see *m*) is existent between the arcs *a a* of the holder, as is requisite.

The handle or pole B, sustaining in service the holder A and attached portions, is preferably of a jointed construction, any desirable number of sections being employed, each section *n n* being removably connected end to end by a sleeve or ferrule *o* or other satisfactory common means of connection. With a handle of this character its length may easily be varied as desirable for the satisfactory manipulating of the picker according to the reach essential.

E indicates a very important element of my fruit-picker structure—viz., the elongated conductor, which chute or carrier is made of duck, canvas, or other satisfactory and sufficiently stiff and strong textile material, its mouth portion *p* being stitched or otherwise firmly secured to the holder A along its entire circumference, including, obviously, the arcs *a a* and segment or smaller arc *c*. This conductor, which gradually diminishes in size toward its outlet-opening *r*, is preferably of such length as to insure a variable portion of its lower extremity in contact with or dragging upon the ground for reasons self-evident.

Interiorly the cylindrical-like conductor I preferably provide at intervals and in an alternating manner segment-shaped pads or cushions 1, formed of cotton-batting or other soft and yielding material, which pads or buffers are secured to the conductor-body E by sewing or other satisfactory means.

If so wished, I may, evidently, so form the pads that they will respectively be of annular contour and transversely circling the inner periphery of the conductor, such continuation being indicated at 2 by dotted work. Especially advantageous will the pads be found when the conductor happens to be on a perpendicular or substantially such plane.

In the pulling of fruit with my device the space D in the rear of the loops or fingers *d d d* insures such satisfactory space within the conductor for the plucked fruit or about-to-be-gathered fruit to fall back into as is essential for a direct central strain thereon, such stated space providing ample room for the rear half of the fruit while the loop *d* is above the forward half.

I dispense with the use of knives or cutters, simply rupturing through fracture the stem of the fruit, whereby no sharp point is left on the stem calculated to puncture fruit when barreled.

I am aware that there are fruit-gatherers provided with a bag or other closed receptacle, and it is to obviate the defects of such that I employ as a feature of my device an elongated conductor, whereby the fruit will not strike each other, as in a bag-receiver, bruising and marring, but, contrariwise, with my conductor the fruit as plucked rolls through same to the ground later to be gathered up.

The padding of the conductor at intervals and alternatingly insures through contact of the fruit with the cushion-like buffers a retarding of the velocity of the rolling fruit, and so lessening the speed of travel of the fruit that by the time it makes its exit from the conductor its impact with the ground is not abrupt, but easy.

The manifold advantages residing in my improved fruit-picker are such as to be readily discernible to all owners of orchards and persons generally engaged in the gathering of fruit of various species.

Having thus fully described my invention, what I claim as new, and desire to secure by Letters Patent, is—

1. In a fruit-picker, a holder A formed of a single length of wire bent to shape, and comprising two large arcs $a\ a$ and rearwardly a smaller arc or segment $c$ forming reverse curves thereto at the points $g\ g$, the arcs $a\ a$ terminating forwardly in outward-abutting extremities $b\ b$ projecting at substantial right angles to the contiguous parts of the arcs and creating a shank $l$ extending downward at an angle to the plane of the curvilinear or body portion of the holder, the forward part $h$ of said holder occupying normally a horizontal plane and the remainder $i$ rising therefrom incliningly, a convoluted or crimped member C extending transversely across the holder at the points $g\ g$ and formed of a single length of wire so bent as to create a plurality of fingers or loops $d$ standing longitudinally to the holder, the extremities of such convoluted member penetrating orifices $e$ in the holder member and upset as at $f$, the aforementioned fingers rising incliningly forward as at K antagonistically to the incline of the rear portion of the holder A, the location of the convoluted member C insuring a requisite space or opening D back of same and within the boundary of the segment $c$ of the holder portion, all combined, arranged and operating substantially as described and for the purposes specified.

2. In a fruit-picker, in combination with a holder A, an elongated cylindrical conductor E constructed of stiff textile material, suspended therefrom, and forming a chute gradually diminishing in size toward its bottom outlet-opening $r$, and interiorly provided at intervals and alternating from side to side, with soft or cushion-like buffers or retarders 1 of semicircular or segmental shape longitudinally, suitably secured to the inner surface of the chute transversely thereto, each buffer or retarder being substantially uniform as to thickness, and curving with that portion of the wall of the conductor whereto secured, all combined and operating as and for the purposes set forth.

3. The combination, in a fruit-picker, of a holder A constructed of an integral length of suitable wire formed to shape, and comprising two large arcs $a\ a$ terminating rearwardly in a smaller arc or segment $c$ which forms reverse curvatures to said large arcs at or approximating the points $g\ g$, aforesaid arcs $a\ a$ forwardly terminating in abutting straight extremities $b\ b$ disposed at substantial right angles to the contiguous parts of said arcs, and by welding creating a shank $l$ extending downward at an angle to the plane of the holder and fitting into the upper extremity of a handle B continuing downward lineal with the shank, the forward portion of the holder created by the large arcs being normally horizontal as at $\bar{h}$, the remaining rearward portions $i$ rising therefrom incliningly, a convoluted member C standing transversely across the holder at substantially the points $g\ g$ and constructed of an integral length of wire so formed as to create one or more fingers or loops $d$, the extremities of said member being firmly secured to the contiguous arcs of the holder, said fingers rising incliningly forward reversely to the incline of the back portion of the holder, as at K, the disposition of the fingers creating a space D intermediately same and the segment $c$ of the holder portion, a lengthy tubular conductor E of textile material hung from the holder, and creating a chute having at its bottom a continuously open outlet $r$, soft buffers or retarders 1 secured to the interior of the conductor at intervals, and alternating from side to side, the respective buffers being of an average thickness throughout their semicircular lengths, and located transversely the chute, substantially as described and shown and for the purposes set forth.

In testimony whereof I have hereunto signed my name, in the presence of two attesting witnesses, at Syracuse, in the county of Onondaga, in the State of New York, this 29th day of June, 1897.

HORATIO E. CADY. [L. S.]

Witnesses:
WM. C. RAYMOND,
A. D. ALLEN.